(12) United States Patent
Childress et al.

(10) Patent No.: US 8,108,098 B2
(45) Date of Patent: Jan. 31, 2012

(54) CONTROL APPROPRIATENESS ILLUMINATION FOR CORRECTIVE RESPONSE

(75) Inventors: Rhonda L. Childress, Austin, TX (US); David Bruce Kumhyr, Austin, TX (US); Pamela Ann Nesbitt, Tampa, FL (US)

(73) Assignee: International Business Machines Corporation, Armonk, NY (US)

( * ) Notice: Subject to any disclaimer, the term of this patent is extended or adjusted under 35 U.S.C. 154(b) by 1175 days.

(21) Appl. No.: 11/854,276

(22) Filed: Sep. 12, 2007

(65) Prior Publication Data

US 2009/0069976 A1 Mar. 12, 2009

(51) Int. Cl.
G06F 9/44 (2006.01)
G06F 17/30 (2006.01)
G06F 17/40 (2006.01)

(52) U.S. Cl. ............... 701/36; 701/37; 701/38; 701/42; 340/438; 340/576; 700/85

(58) Field of Classification Search ............... 701/36, 701/37, 38, 42; 700/85; 340/438, 461, 576
See application file for complete search history.

(56) References Cited

U.S. PATENT DOCUMENTS

| | | | |
|---|---|---|---|
| 4,631,515 A | 12/1986 | Blee et al. | |
| 5,321,602 A | 6/1994 | Francisco | |
| 5,483,448 A * | 1/1996 | Liubakka et al. | 701/37 |
| 5,548,516 A * | 8/1996 | Gudat et al. | 701/200 |
| 5,557,055 A | 9/1996 | Breitweiser, Jr. | |
| 5,691,898 A * | 11/1997 | Rosenberg et al. | 700/85 |
| 5,847,704 A * | 12/1998 | Hartman | 715/764 |
| 5,907,487 A * | 5/1999 | Rosenberg et al. | 700/85 |
| 6,006,143 A * | 12/1999 | Bartel et al. | 701/1 |
| 6,185,489 B1 * | 2/2001 | Strickler | 701/29 |
| 6,271,745 B1 * | 8/2001 | Anzai et al. | 340/5.53 |
| 6,427,107 B1 * | 7/2002 | Chiu et al. | 701/50 |
| 6,567,731 B2 * | 5/2003 | Chandy | 701/36 |
| 6,658,218 B2 | 12/2003 | Krolczyk et al. | |
| 6,671,595 B2 * | 12/2003 | Lu et al. | 701/36 |
| 6,694,236 B2 * | 2/2004 | Onodera | 701/36 |
| 6,707,379 B2 | 3/2004 | Nagasaka | |
| 6,789,003 B2 * | 9/2004 | Magner et al. | 701/2 |
| 6,804,594 B1 * | 10/2004 | Chen et al. | 701/42 |
| 6,932,183 B2 * | 8/2005 | Jeppe et al. | 180/333 |
| 6,972,665 B2 * | 12/2005 | Wang et al. | 340/425.5 |
| 6,982,631 B2 * | 1/2006 | Kemper | 340/426.11 |
| 7,023,174 B2 * | 4/2006 | Fromme et al. | 320/104 |
| 7,042,333 B2 * | 5/2006 | Dix et al. | 340/5.72 |
| 7,170,400 B2 * | 1/2007 | Cowelchuk et al. | 340/438 |
| 7,190,798 B2 * | 3/2007 | Yasuhara | 381/86 |
| 7,222,007 B2 * | 5/2007 | Xu et al. | 701/38 |
| 7,225,976 B1 * | 6/2007 | Moberg | 235/380 |
| 7,280,046 B2 * | 10/2007 | Berg et al. | 340/576 |
| 7,332,684 B2 * | 2/2008 | Tozuka et al. | 200/61.27 |

(Continued)

*Primary Examiner* — Thomas Black
*Assistant Examiner* — Wae Louie
(74) *Attorney, Agent, or Firm* — Yee & Associates, P.C.; Steven L. Bennett

(57) ABSTRACT

A computer implemented method, apparatus, and computer code product for a data processing system provide feedback to an operator of a vehicle indicating the appropriateness of an attempted actuation of a vehicle control. A current operating state of the vehicle is first identified. Responsive to identifying the current operating state, preferred control actions corresponding to the current operating state are identified. Responsive to receiving a notification of an attempted actuation of the vehicle control, the attempted actuation is compared to the preferred control actions. If the attempted actuation is one of the preferred control actions, an indicator is illuminated with a first color. If the attempted actuation is not one of the preferred control actions, the indicator is illuminated with a second color.

20 Claims, 3 Drawing Sheets

U.S. PATENT DOCUMENTS

| | | | |
|---|---|---|---|
| 7,602,947 B1 * | 10/2009 | Lemelson et al. | 382/116 |
| 7,675,258 B2 * | 3/2010 | Dattilo et al. | 318/568.11 |
| 7,719,431 B2 * | 5/2010 | Bolourchi | 340/576 |
| 7,737,374 B2 * | 6/2010 | Cheon et al. | 200/5 R |
| 2006/0184253 A1 | 8/2006 | Andrews et al. | |
| 2009/0069976 A1 * | 3/2009 | Childress et al. | 701/36 |

\* cited by examiner

CONTROL APPROPRIATENESS ILLUMINATION FOR CORRECTIVE RESPONSE

BACKGROUND OF THE INVENTION

1. Field of the Invention

The present invention relates generally to a computer implemented method, apparatus, and computer code products for a data processing system. More specifically, the present invention relates to data processing systems, methods and computer product code for providing indicator feedback to an operator of a vehicle based on the vehicle's current operating state, and an attempted control actuation of the vehicle within that operating state.

2. Description of the Related Art

Confusion over controls while operating a vehicle—grabbing the wrong knob or flipping the wrong switch—happens all the time. As a simple example, consider a driver preparing to operate a car. After turning the ignition, the driver reaches down and pulls the hood release instead of the parking brake release.

More serious things can happen in a flight environment. While preparing for takeoff, a pilot may flip a switch attempting to raise the flaps and instead raises the landing gear while the airplane is still on the runway. Similarly, but with perhaps more devastating effects, a pilot may attempt to add carburetor heat when on a landing approach, and instead leans the engine fuel mixture to zero.

Human factors engineers have worked on this problem for many years using standard placement of controls, using different and strange shapes for the control surface and checklists to help inform the human operators of the difference between the controls. Operators were encouraged to "think" through the action rather than relying on the rote and making a mistake. Despite advances in control recognition, there remains a need to provide operators of vehicles with immediate feedback to attempted control actuation.

SUMMARY OF THE INVENTION

A computer implemented method, apparatus, and computer code product for a data processing system provide feedback to an operator of a vehicle indicating the appropriateness of an attempted actuation of a vehicle control. A current operating state of the vehicle is first identified. Responsive to identifying the current operating state, preferred control actions corresponding to the current operating state are identified. Responsive to receiving a notification of an attempted actuation of the vehicle control, the attempted actuation is compared to the preferred control actions. If the attempted actuation is one of the preferred control actions, an indicator is illuminated with a first color. If the attempted actuation is not one of the preferred control actions, the indicator is illuminated with a second color.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
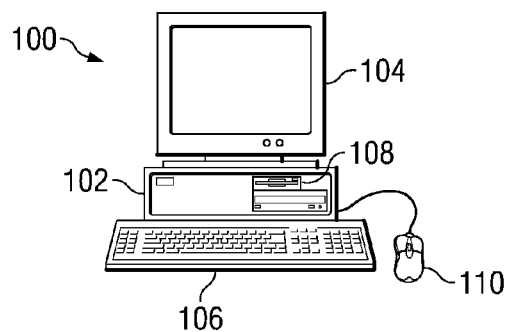
FIG. 1 is a pictorial representation of a data processing system in which illustrative embodiments may be implemented.

With reference now to the figures and in particular with reference to FIG. 1, a pictorial representation of a data processing system is shown in which illustrative embodiments may be implemented. Computer 100 includes system unit 102, video display terminal 104, keyboard 106, storage devices 108, which may include floppy drives and other types of permanent and removable storage media, and mouse 110. Additional input devices may be included with personal computer 100. Examples of additional input devices could include, for example, a joystick, a touchpad, a touch screen, a trackball, and a microphone.

Computer 100 may be any suitable computer, such as an IBM® eServer™ computer or IntelliStation® computer, which are products of International Business Machines Corporation, located in Armonk, N.Y. Although the depicted representation shows a personal computer, other embodiments may be implemented in other types of data processing systems. For example, other embodiments may be implemented in a network computer. Computer 100 also preferably includes a graphical user interface (GUI) that may be implemented by means of systems software residing in computer readable media in operation within computer 100.

Figure 2:
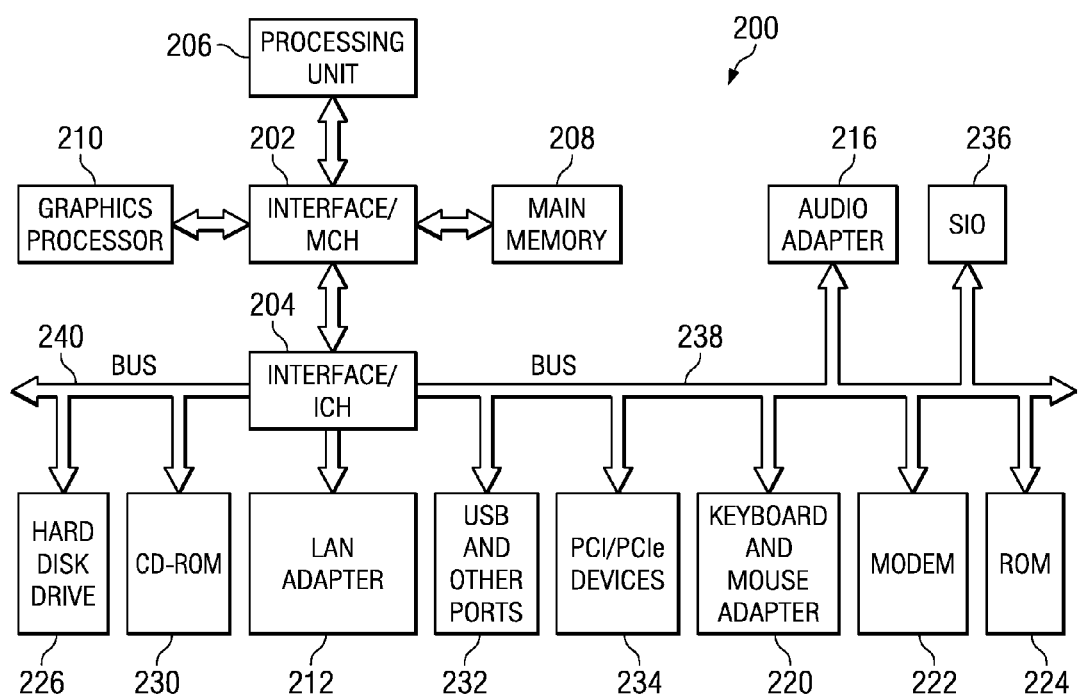
FIG. 2 is a block diagram of a data processing system in which illustrative embodiments may be implemented.

Next, FIG. 2 depicts a block diagram of a data processing system in which illustrative embodiments may be implemented. Data processing system 200 is an example of a computer, such as computer 100 in FIG. 1, in which code or instructions implementing the processes of the illustrative embodiments may be located.

In the depicted example, data processing system 200 employs a hub architecture including an interface and memory controller hub (interface/MCH) 202 and an interface and input/output (I/O) controller hub (interface/ICH) 204. Processing unit 206, main memory 208, and graphics processor 210 are coupled to interface and memory controller hub 202. Processing unit 206 may contain one or more processors and even may be implemented using one or more heterogeneous processor systems. Graphics processor 210 may be coupled to interface and memory controller hub 202 through an accelerated graphics port (AGP), for example.

In the depicted example, local area network (LAN) adapter 212 is coupled to interface and I/O controller hub 204, audio adapter 216, keyboard and mouse adapter 220, modem 222, read only memory (ROM) 224, universal serial bus (USB) and other ports 232. PCI/PCIe devices 234 are coupled to interface and I/O controller hub 204 through bus 238. Hard disk drive (HDD) 226 and CD-ROM 230 are coupled to interface and I/O controller hub 204 through bus 240.

PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to interface and I/O controller hub 204.

An operating system runs on processing unit 206. This operating system coordinates and controls various components within data processing system 200 in FIG. 2. The operating system may be a commercially available operating system, such as Microsoft® Windows Vista™. (Microsoft® and Windows Vista are trademarks of Microsoft Corporation in the United States, other countries, or both). An object oriented programming system, such as the Java™ programming system, may run in conjunction with the operating system and provides calls to the operating system from Java™ programs or applications executing on data processing system 200. Java™ and all Java™-based trademarks are trademarks of Sun Microsystems, Inc. in the United States, other countries, or both.

Instructions for the operating system, the object-oriented programming system, and applications or programs are located on storage devices, such as hard disk drive 226. These instructions and may be loaded into main memory 208 for execution by processing unit 206. The processes of the illustrative embodiments may be performed by processing unit 206 using computer implemented instructions, which may be located in a memory. An example of a memory is main memory 208, read only memory 224, or in one or more peripheral devices.

The hardware shown in FIG. 1 and FIG. 2 may vary depending on the implementation of the illustrated embodiments. Other internal hardware or peripheral devices, such as flash memory, equivalent non-volatile memory, or optical disk drives and the like, may be used in addition to or in place of the hardware depicted in FIG. 1 and FIG. 2. Additionally, the processes of the illustrative embodiments may be applied to a multiprocessor data processing system.

The systems and components shown in FIG. 2 can be varied from the illustrative examples shown. In some illustrative examples, data processing system 200 may be a personal digital assistant (PDA). A personal digital assistant generally is configured with flash memory to provide a non-volatile memory for storing operating system files and/or user-generated data. Additionally, data processing system 200 can be a tablet computer, laptop computer, or telephone device.

Other components shown in FIG. 2 can be varied from the illustrative examples shown. For example, a bus system may be comprised of one or more buses, such as a system bus, an I/O bus, and a PCI bus. Of course the bus system may be implemented using any suitable type of communications fabric or architecture that provides for a transfer of data between different components or devices attached to the fabric or architecture. Additionally, a communications unit may include one or more devices used to transmit and receive data, such as a modem or a network adapter. Further, a memory may be, for example, main memory 208 or a cache such as found in interface and memory controller hub 202. Also, a processing unit may include one or more processors or CPUs.

The depicted examples in FIG. 1 and FIG. 2 are not meant to imply architectural limitations. In addition, the illustrative embodiments provide for a computer implemented method, apparatus, and computer usable program code for compiling source code and for executing code. The methods described with respect to the depicted embodiments may be performed in a data processing system, such as data processing system 100 shown in FIG. 1 or data processing system 200 shown in FIG. 2.

Figure 3:
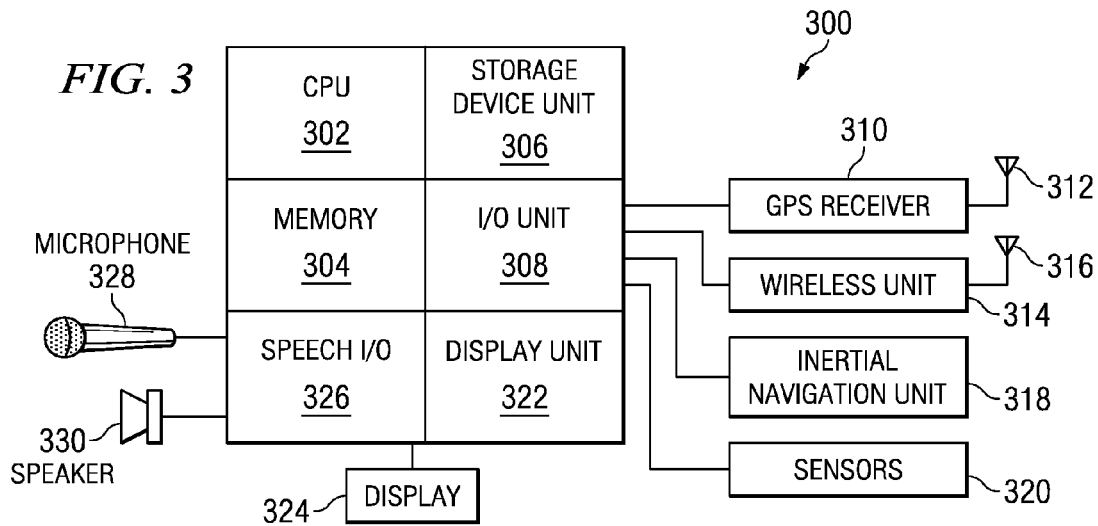
FIG. 3 is a block diagram of an automotive computing platform in accordance with an illustrative embodiment.

Turning next to FIG. 3, a block diagram of an automotive computing platform is depicted in accordance with an illustrative embodiment. Computing platform 300 is located within a vehicle, such as an automobile or truck. Computing platform 300 includes CPU 302, which may be an embedded processor or processor such as a Pentium processor from Intel Corporation. "Pentium" is a trademark of Intel Corporation. Computing platform 300 also includes memory 304, which may take the form of random access memory (RAM) and/or read only memory (ROM).

Computing platform 300 also contains a storage device unit 306. Storage device unit 306 may contain one or more storage devices, such as, for example, a hard disk drive, a flash memory, a DVD drive, or a floppy disk. Computing platform 300 also includes an input/output (I/O) unit 308, which provides connections to various I/O devices. In this example, a GPS receiver 310 is included within automotive computing platform 300 and receives signals through antenna 312. Wireless unit 314 provides for two-way communications between computing platform 300 and another data processing system, such as server 104 in FIG. 1. Communications are provided through antenna 316. In addition, inertial navigation unit 318 is connected to I/O unit 308. Inertial navigation unit 318 is employed for navigation when GPS receiver 310 is unable to receive a usable signal or is inoperable.

A multitude of different sensors 320 also are connected to I/O unit 308. These sensors may include sensors that detect speed, unusually high acceleration forces, airbag deployment, and extensive speed up and slow down cycles, dropping out of cruise control, brake use, anti-lock brake occurrences, traction control use, windshield wiper use, turning on or off of lights for the automobile, and outside light levels. In addition, sensors 320 may include sensors for detecting steering wheel movement, temperature, the state of door locks, and the state of windows. In other words, almost any condition or parameter about or around an automobile may be detected through the use of sensors 320.

Computing platform 300 also includes display unit 322, which is connected to display 324. In the depicted example, this display is a touch screen display. Alternatively or in addition to a touch screen display, display 324 also may employ a heads-up display projected onto the windshield of the automobile. Computing platform 300 also includes microphone 328 and speaker 330 to provide a driver with an ability to enter commands and receive responses through speech I/O 326 without having to divert the driver's attention away from the road, or without the driver having to remove the driver's hands from the steering wheel.

Figure 4:
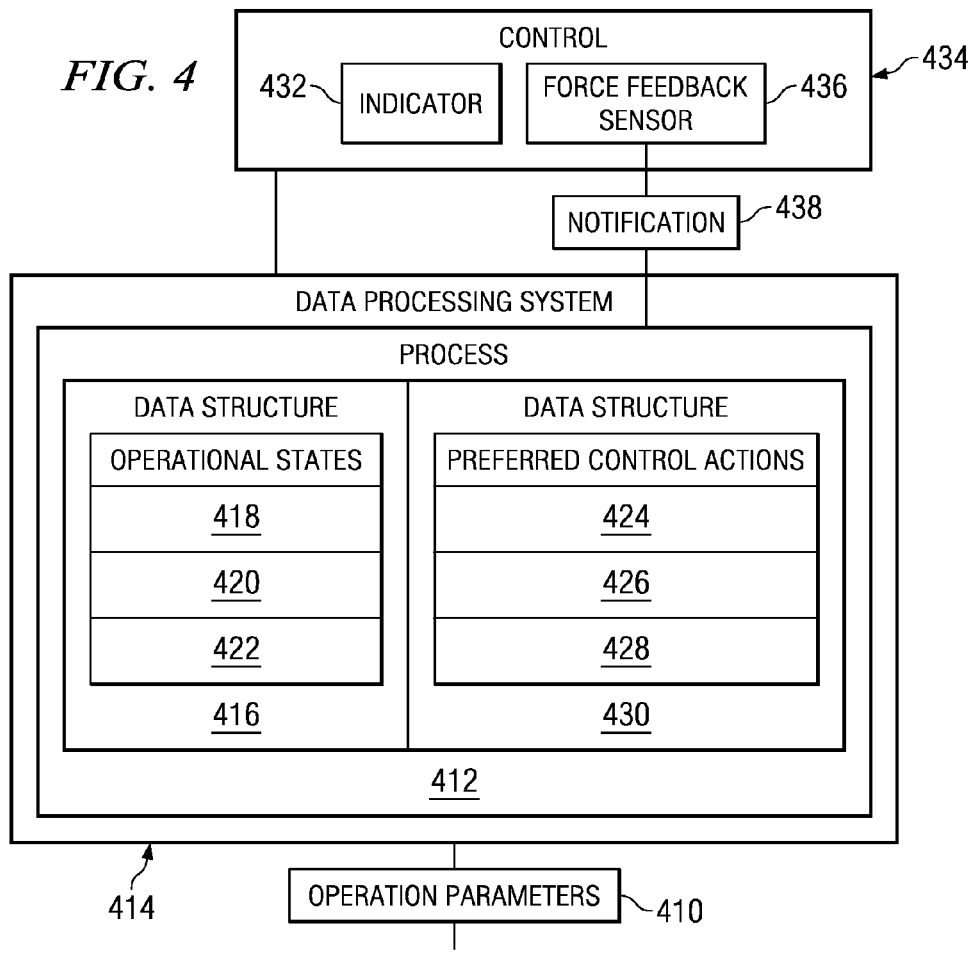
FIG. 4 is a data flow diagram depicting the flow of data between various hardware and software components of a data processing system in accordance with an illustrative embodiment.

Referring now to FIG. 4, a data flow diagram depicting the flow of data between various hardware and software components of a data processing system is shown in accordance with an illustrative embodiment.

Operation parameters 410 are input from a vehicle or other machine, into process 412 of data processing system 414. Data processing system 414 can be data processing system 200 of FIG. 2. Operation parameters 410 are inputs identified from other vehicle systems that provide information on the vehicle's current operational state. In the case of an automobile, operational parameters can include, but are not limited to, velocity, current gear selection, door/hood/trunk position, steering wheel position, or the status or position of any other automobile feature for which the driver or automobile passenger is provided a control. In the case of an airplane, operational parameters can include, but are not limited to, air speed, attack angles, landing gear positions, rudder position, flap position, aileron position, elevator position, prop pitch, fuel mixture indicators, speed brake position, parking brake position, as well as the status or position of any other feature or control for which the pilot is provided a control.

Process 412 is a software process capable of determining the operation state of the vehicle based on operation parameters 410. Responsive to identifying operation parameters 410, process 412 determines the operational state of the vehicle. Process 412 uses data structure 416 to determine one of possible operational states 418-422, based on the input of operational parameters. Data structure 416 can be an associative array, a search tree, a look-up table, a hash map, or any other data structure capable of returning a probably operational state based on the input of operation parameters 410.

Current operational state 418 is the current condition of vehicle. Current operational state 418 is also a convenient representation of the sum of all operation parameters 410. Current operational state 418 is selected from the possible operational states 418-422.

For any given operational state from the possible operational states 418-422, there are certain preferred control actions 424-428 that can be performed by the vehicle operator. Preferred control actions 424-428 can be control actions that are typically performed to the vehicle, given the operational state. Similarly, preferred control actions 424-428 may be those control actions that will not produce an undesirable, or possibly dangerous, effect if the control action is performed. Conversely, an undesirable control action (not shown) may be those control actions that will produce an undesirable, or possibly dangerous, effect if the control action is performed.

Returning to the example of an automobile, if the car is moving forward at a velocity of 50 miles per hour, indicative of a certain operational state, preferable control actions 424-428 may include applying the brake, applying the accelerator, turning the steering wheel within an acceptable angular range, etc. Undesirable control actions might include shifting the automobile into reverse, or turning the steering wheel beyond an acceptable angular range.

Preferred control actions 424-428 are stored in data structure 430. Data structure 430 associates preferred control actions 424-428 with the operational state 418-422 of the vehicle. Data structure 430 can be an associative array, a search tree, a look-up table, a hash map, or any other data structure capable of returning preferred control actions 424-428 based on the operational state 418-422. In one illustrative embodiment, data structure 430 and data structure 416 can be a single data structure.

Data processing system 414 is connected to indicator 432. Indicator 432 can be one or more low voltage light sources, such as a light emitting diode (LED). Indicator 432 is provided to control 434 located in the vehicle. Control 434 provides the vehicle operator with control over at least one of the various control actions 424-428 that can be performed on the vehicle. Returning to the example of an automobile, the plurality of controls 434 can be a steering wheel, an accelerator pedal, a brake pedal, a turn signal lever, or other operator manipulated controls.

A single indicator is described for simplicity purposes only. Indicator 432 can be a plurality of indicators, each attached to a different control. In this manner, indicators can be provided to a plurality of controls located throughout the vehicle.

Control 434 is provided with a force feedback sensor 436. Force feedback sensor provides notification 438 to process 412 of data processing system 414 that the vehicle operator is attempting to actuate control 434.

Responsive to receiving notification 438, process 412 determines whether the attempted actuation is one of the preferred control actions 424 corresponding to the vehicle's current operational state 418. Process 412 compares the attempted actuation to the list of preferred control actions 424 for the vehicle's current operational state 418. If the attempted actuation is one the preferred control actions 424, process 412 will cause indicator 432 to illuminate a first color, preferably green, indicating that the attempted actuation is one of a preferred control action 424-428.

If the attempted actuation is not one the preferred control actions 424-428, and therefore an undesirable control action, process 412 will cause indicator 432 to illuminate a second color, preferably red, indicating that the attempted actuation is not one of preferred control actions 424-428. A vehicle operator receiving feedback that the attempted actuation of control 434 is an undesirable control action may wish to rethink the wisdom of the attempted actuation, or reexamine to determine whether actuation of a control different from control 434 is instead intended.

Figure 5:
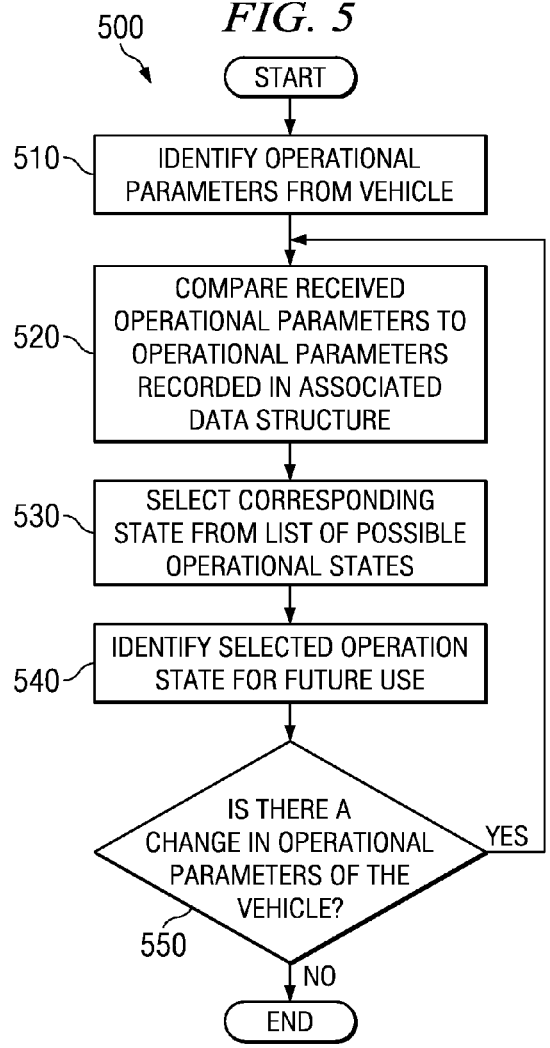
FIG. 5 is a flowchart indicating the process steps for determining the current operating state of a vehicle in accordance with an illustrative embodiment of the invention.

Referring now to FIG. 5, a flowchart indicating the process steps for determining the current operating state of a vehicle is shown in accordance with an illustrative embodiment of the invention. Process 500 is a software process executing on a data processing system, such as data processing system 414 of FIG. 4. Process 500 can be process 412 of FIG. 4.

Process 500 begins by identifying operational parameters from the vehicle (step 510). Operational parameters are inputs from other vehicle systems that provide information on the vehicle's current operational state. In the case of an automobile, operational parameters can include, but are not limited to, velocity, current gear selection, door/hood/trunk position, steering wheel position, or the status or position of any other automobile feature for which the driver or automobile passenger is provided a control. In the case of an airplane, operational parameters can include, but are not limited to, air speed, attack angles, landing gear positions, rudder position, flap position, aileron position, elevator position, prop pitch, fuel mixture indicators, speed brake position, parking brake position, as well as the status or position of any other feature or control for which the pilot is provided a control.

Responsive to receiving operational parameters, process 500 compares the received operational parameters to operational parameters recorded in an associated data structure (step 520). The associated data structure contains a listing of possible operational states. Data structure can be an associative array, a search tree, a look-up table, a hash map, or any other data structure capable of returning a probably operational state based on the input of operation parameters. Based on the operational parameters received, a corresponding or best matching operational state is selected from the list of possible operational states (Step 530).

Process 500 then identifies the selected operational state for future use (step 540). This identification can be through flagging the selected operational state, storing the selected operational state in an associated memory, or otherwise distinguishing the selected operational state from the other operational states in the data structure.

Finally, process 500 monitors the vehicle for a change in the operational parameters (step 550). If a change in the operational parameters is detected, process 500 returns to step 520 to determine a new operational state for the vehicle. The process loops infinitely until the vehicle is turned off, or is no longer in an operational state.

Figure 6:
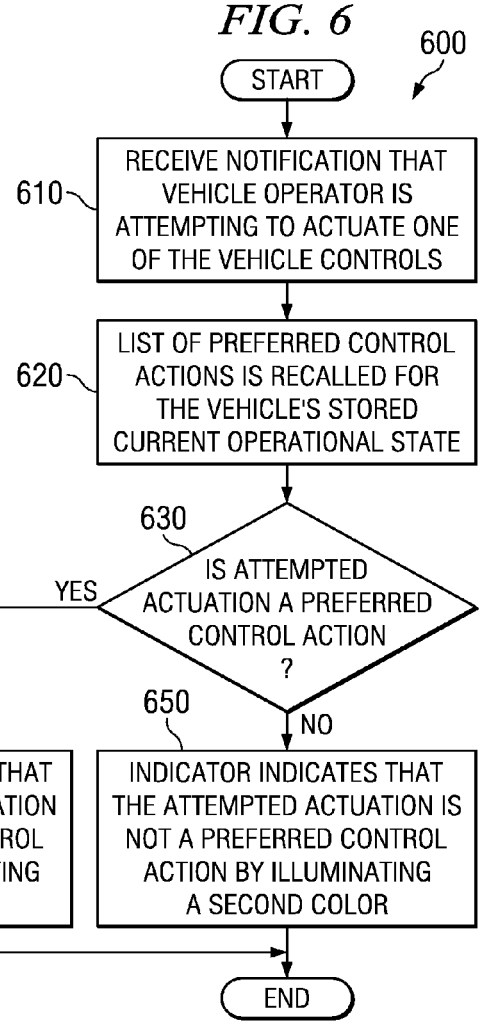
FIG. 6 is a flowchart indicating the process steps for providing feedback to a control based on an actuation while a vehicle is in a specific operating state in accordance with an illustrative embodiment of the invention.

Referring now to FIG. 6, a flowchart indicating the process steps for providing feedback to a control based on an actuation while a vehicle is in a specific operating state is shown in accordance with an illustrative embodiment of the invention. Process 600 is a software process executing on a data processing system, such as data processing system 414 of FIG. 4. Process 600 can be process 412 of FIG. 4.

Process 600 begins by receiving a notification that the vehicle operator is attempting to actuate one of the vehicle controls (step 610). Each control within the vehicle is provided with a force feedback sensor. Upon attempted actuation of the control, or a slight actuation of the control, the force feedback sensor provides to process 600 a notification of the attempted actuation, and what that actuation entails.

Responsive to receiving this notification, process 600 determines whether the attempted actuation is one the preferred control actions for the vehicle's current operational state. A current operational state is either determined, or recalled from an identified state by a process such as that shown and described in FIG. 4. Once the current operational state is identified, process 600 recalls the list of preferred control actions for the vehicle's stored current operational state (step 620), and compares the attempted actuation to the list of preferred control actions for the vehicle's current operational state (step 630).

For any given operational state, there are certain preferred control actions that can be performed by the vehicle operator. Preferred control actions can be control actions that are typically performed to the vehicle, given the operational state. Similarly, preferred control actions may be those control actions that will not produce an undesirable, or possibly dangerous, effect if the control action is performed. Conversely, an undesirable control action may be those control actions that will produce an undesirable, or possibly dangerous, effect if the control action is performed.

If the attempted actuation is one the preferred control actions ("yes at step 630), process 600 will cause an indicator on or within the control to illuminate a first color, preferably green, indicating that the attempted actuation is one of a preferred control action (step 640), with the process terminating thereafter.

If the attempted actuation is not one the preferred control actions ("no" at step 630), and therefore an undesirable control action, process 600 will cause the indicator to illuminate a second color, preferably red, indicating that the attempted actuation is not one of a preferred control action, with the process terminating thereafter. A vehicle operator receiving feedback that the attempted actuation of control is an undesirable control action may wish to rethink the wisdom of the attempted actuation, or reexamine to determine whether actuation of a control different from the attempted control is instead intended.

Thus, the present invention provides a computer implemented method, apparatus, and computer code product for a data processing system that provides feedback to an operator of a vehicle indicating the appropriateness of an attempted actuation of a vehicle control. A current operating state of the vehicle is first identified. Responsive to identifying the current operating state, preferred control actions corresponding to the current operating state are identified. Responsive to receiving a notification of an attempted actuation of the vehicle control, the attempted actuation is compared to the preferred control actions. If the attempted actuation is one of the preferred control actions, an indicator is illuminated with a first color. If the attempted actuation is not one of the preferred control actions, the indicator is illuminated with a second color.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for providing feedback to an operator of a vehicle indicating the appropriateness of an attempted actuation of a vehicle control, the method comprising:
   identifying a current operating state of the vehicle;
   responsive to identifying the current operating state, identifying preferred control actions corresponding to the current operating state;
   receiving a notification of an attempted actuation of the vehicle control;
   responsive to receiving the notification, identifying whether the attempted actuation is one of the preferred control actions;
   responsive to identifying that the attempted actuation is one of the preferred control actions, illuminating an indicator with a first color; and
   responsive to not identifying that the attempted actuation is one of the preferred control actions, illuminating the indicator with a second color.

2. The computer implemented method of claim 1, wherein the step of identifying the current operating state is in response to receiving operation parameters from the vehicle, the operating state being identified based on the operation parameters.

3. The computer implemented method of claim 1, wherein the current operating state is selected from a database of possible operating states.

4. The computer implemented method of claim 3, wherein the database is an associative array, a search tree, a look-up table, or a hash map.

5. The computer implemented method of claim 1, wherein the notification is provided from a force feedback sensor attached to the vehicle control.

6. The computer implemented method of claim 1, wherein the indicator is one or more low voltage light sources.

7. The computer implemented method of claim 6, wherein the indicator is a light emitting diode.

8. The computer implemented method of claim 1, wherein the first color is green and the second color is red.

9. A computer program product comprising:
   a computer readable medium having computer usable program code for providing feedback to an operator of a vehicle indicating the appropriateness of an attempted actuation of a vehicle control, the computer program product comprising:
   computer usable program code for identifying a current operating state of the vehicle;
   computer usable program code, responsive to identifying the current operating state, for identifying preferred control actions corresponding to the current operating state;
   computer usable program code for receiving a notification of an attempted actuation of the vehicle control;
   computer usable program code, responsive to receiving the notification, for identifying whether the attempted actuation is one of the preferred control actions;
   computer usable program code, responsive to identifying that the attempted actuation is one of the preferred control actions, for illuminating an indicator with a first color; and
   computer usable program code, responsive to identifying that the attempted actuation is not one of the preferred control actions, for illuminating the indicator with a second color.

10. The computer program product of claim 9, wherein the computer usable program code for identifying a current operating state of the vehicle is responsive to receiving operation parameters from the vehicle, the operating state being identified based on the operation parameters.

11. The computer program product of claim 9, wherein the current operating state is selected from a database of possible operating states.

12. The computer program product of claim 11, wherein the database is an associative array, a search tree, a look-up table, or a hash map.

13. The computer program product of claim 9, wherein the notification is provided from a force feedback sensor attached to the vehicle control.

14. The computer program product of claim 9, wherein the indicator is one or more low voltage light sources.

15. The computer program product of claim 14, wherein the indicator is a light emitting diode.

16. The computer program product of claim 15, wherein the first color is green and the second color is red.

17. A data processing system comprising:
   a bus;
   a communications unit connected to the bus;
   a storage device connected to the bus, wherein the storage device includes computer usable program code for providing feedback to an operator of a vehicle indicating the appropriateness of an attempted actuation of a vehicle control; and
   a processor unit connected to the bus, wherein the processor unit executes the computer usable program code to identify a current operating state of the vehicle, responsive to identifying the current operating state, identify preferred control actions corresponding to the current operating state, receive a notification of an attempted actuation of the vehicle control, responsive to receiving the notification, identify whether the attempted actuation is one of the preferred control actions, responsive to identifying that the attempted actuation is one of the preferred control actions, illuminate an indicator with a first color, and responsive to not identifying that the attempted actuation is one of the preferred control actions, illuminate the indicator with a second color.

18. The data processing system of claim 17, wherein the processor unit executing the computer usable program code to identify the current operating state is responsive to receiving operation parameters from the vehicle, the operating state being identified based on the operation parameters, and wherein the current operating state is selected from a database of possible operating states.

19. The data processing system of claim 17, wherein the database is an associative array, a search tree, a look-up table, or a hash map.

20. The data processing system of claim 17, wherein the indicator is one or more light emitting diodes, and wherein the first color is green and the second color is red.

* * * * *